United States Patent Office 3,629,290
Patented Dec. 21, 1971

3,629,290
DERIVATIVES OF CHROMONE-2-CARBOXYLIC ACID
Hugh Cairns, Sandbach, Richard Hazard, Knutsford, and John King, Loughborough, England, assignors to Fisons Pharmaceuticals Limited, Loughborough, England
No Drawing. Filed Oct. 14, 1968, Ser. No. 767,470
Claims priority, application Great Britain, Oct. 17, 1967, 47,211/67
Int. Cl. C07d 7/34
U.S. Cl. 260—345.2
14 Claims

ABSTRACT OF THE DISCLOSURE

Chromone derivatives of the formula

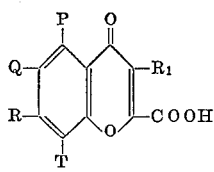

in which at least one of Q, R or T represents —OY wherein Y is selected from the group consisting of hydroxy-alkyl, alkoxy-alkyl, carboxyl-alkyl, dihydroxyalkyl, alkoxy-alkoxy-alkyl, alkoxy-hydroxy-alkyl, phenoxyalkyl, furfuryl, tetrahydrofurfural, dioxolanyl, alkyl substituted dioxolanyl, glucosyl and ribosyl in which groups the alkyl and alkoxy portions are lower alkyl or lower alkoxy, P and those of Q, R and T which do not form a —OY group are selected from hydrogen, halogen, alkyl containing from 1 to 10 carbon atoms, alkyl containing from 1 to 10 carbon atoms and substituted by halogen, hydroxy or lower alkoxy; hydroxy, alkoxy containing from 1 to 10 carbon atoms, carboxy, nitro, lower alkylamino, di-lower alkyl amino or anilino, or an adjacent pair of P and those of Q, R, and T which do not represent a —OY group, together with the adjacent carbon atoms on the benzene ring, form a pyridine or benzene ring, or an adjacent pair of P and those of Q, R and T which do not represent a —OY group form the chains —(CH₂)₄—,
—(CH₂)₃—,
—O(CH₂)₃—,
—O(CH₂)₂—,
—O(CH₂)₂O—,
—CH₂—CH(CH₃)—O—,
—CH=CH—O—,
—CH=C(CH₃)—O—,
—OCH₂O—,
—NH—C(R⁴R⁵)—CH₂—O—,
—NR⁵(CH)₂—O— or
—NR⁴(CH)₂—NR⁴— wherein R⁴ is hydrogen or a lower alkyl or a lower alkoxy group and R⁵ is hydrogen, or R⁴ and R⁵ together form an =O group, R₁ is selected from the hydrogen, alkyl, aryl and alkoxy containing from 1 to 10 carbon atoms, and pharmaceutically acceptable derivatives thereof, are valuable in the treatment of diseases due to antigen reactions such as asthma.

The present invention relates to novel compounds, their preparation and use.

From one aspect the invention provides the novel compounds of the formula:

4382

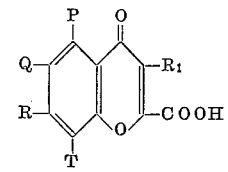

and functional derivatives thereof, wherein P is hydrogen or a substituent other than an OY group; Q, R and T are each the same or different and are hydrogen or substituents other than hydrogen, at least one of Q, R or T being a group OY wherein Y is an alkyl group which carries one or more hydroxyl or carboxyl substituent groups, is an alkyl or aralkyl group in which one or more of the CH₂ groups has been replaced by oxygen, sulphur or a carbonyl group, which alkyl or aralkyl groups may carry one or more hydroxyl or carboxyl substituent groups, is a heterocyclic ring containing carbon and oxygen atoms, which ring may be substituted by one or more hydroxyl or alkyl groups, or is an alkyl group carrying one or more substituent heterocyclic groups, which heterocyclic groups may carry one or more hydroxyl or alkyl groups; and R₁ is hydrogen, an alkyl or alkoxy group containing from 1 to 10 carbon atoms, an aryl group, a substituted alkyl or alkoxy group which group contains from 1 to 10 carbon atoms, or a substituted aryl group.

Compounds of the invention include those wherein P and those of Q, R or T which do not form OY groups are hydrogen; alkyl groups containing from 1 to 10 carbon atoms (e.g. methyl, ethyl, butyl, pentyl, and hexyl groups); substituted alkyl groups (e.g. alkyl groups carrying halo; hydroxy; alkoxy, e.g. methoxy, ethoxy, propoxy or pentoxy; acetoxy; carboxy; amino; alkylamino e.g. ethylamino, butylamino or pentylamino; dialkylamino e.g. dimethylaminoethyl, diethylaminomethyl, diethylaminoethyl, dibutylaminopropyl, dipentylaminopentyl; hydroxylamino; or hydrazino substituent groups) derived from the above alkyl groups; unsaturated alkyl groups (e.g. alkenyl groups such as allyl and propargyl groups) derived from the above alkyl groups; aralkyl groups (e.g. benzyl and phenethyl groups) wherein the alkyl groups contain 1 to 10 carbon atoms; substituted aralkyl groups (e.g. haloaralkyl and alkylaralkyl groups); mono and polybenzenoid aryl groups (e.g. phenyl and naphthyl groups); substituted aryl groups (e.g. alkaryl, haloaryl, nitroaryl, carboxyaryl and hydroxyaryl groups); heterocyclic groups (e.g. pyridyl, furyl or pyrrolyl groups); substituted heterocyclic groups; cycloalkyl groups containing from 4–6 carbon atoms (e.g. cyclopentyl or cyclohexyl groups); substituted cycloalkyl groups carrying hydroxyl, alkoxyl or carboxy substitutents (e.g. hydroxycycloalkyl or carboxycyloalkyl groups); nitrile groups; iminoether groups; amidine groups; nitro groups; nitroso groups; hydroxy groups; alkoxy groups containing 1 to 10 carbon atoms (e.g. methoxy, ethoxy or propoxy groups); substituted alkoxy groups other than an OY group (e.g. haloalkoxy, aminoalkoxy, alkylaminoalkoxy, or dialkylaminoalkoxy groups); unsaturated alkoxy groups (i.e. alkenyloxy or alknyloxy groups); aryloxy groups (e.g. phenyloxy or naphthyloxy groups); substituted aryloxy groups; heteroyloxy groups (e.g. pyridyloxy group); cycloalkyloxy group (e.g. cyclohexyloxy or cyclopentyloxy groups); epoxyalkoxy groups; amino groups; alkylamino groups (e.g. ethylamino and propyylamino groups); dialkylamino groups (e.g. dimethylamino and diethylamino groups); cycloalkylamino groups; arylamino groups (e.g. phenylamino and naphthylamino groups); diarylamino groups (e.g. diphenylamino group); haloalkylamino groups; alkenylamino groups; aminoalkylamino groups; amine oxide groups, oxime groups; hydroxylamine groups; azo groups; hydrazino groups; hydrazide groups, hydrazone groups; heterocyclic amino groups; imide groups; urea groups; thiourea groups; guanidine groups; thiol groups; alkyl thiol groups; substituted alkyl thiol groups; aryl thiol groups; substituted aryl thiol groups; sulphonic acid groups (including salts, esters or amides thereof); and halogen atoms (e.g. chlorine, bromine, or iodine atoms).

In addition to the above values an adjacent pair of the groups P, Q, R or T may form a fused carbocyclic (e.g. benzene) or heterocyclic (e.g. pyridine) ring together with the adjacent carbon atoms in the benzene ring. Thus, an adjacent pair of the groups may form the chains —(CH$_2$)$_4$—, —(CH$_2$)$_3$—, —O(CH$_2$)$_3$—, —O(CH$_2$)$_2$—,
—O(CH$_2$)$_2$O—, —CH$_2$—CH(CH$_3$)—O—
—CH=CH—O—, —CH=C(CH$_3$)—O—
—OCH$_2$O—, —NH—C(R$^4$R$^5$)—CH$_2$—O—
—NR$^5$(CH)$_2$—O— or —NR$^4$(CH)$_2$—NR$^4$—

(wherein R$^4$ is hydrogen or an alkyl or alkoxy group and R$^5$ is hydrogen, or R$^4$ and R$^5$ together form a =O group). These chains may be bonded to the benzene ring in either sense.

The group or groups OY may be any of those described above.

Where the group Y is an alkyl group substituted with one or more hydroxy groups it is preferred that the alkyl group contains at least two carbon atoms and not more than eight carbon atoms. Examples of hydroxyalkyl groups include hydroxyethyl, hydroxypropyl, dihydroxypropyl, hydroxybutyl, dihydroxybutyl and trihydroxybutyl. Where the group Y is an alkyl group interrupted by one or more oxygen atoms it is preferred that the alkyl group contains at least two carbon atoms but not more than ten carbon atoms. Examples of such groups include methoxymethyl, ethoxymethyl, ethoxyethyl, hydroxyethoxyethyl, ethoxypropyl and acetoxymethyl.

The group Y may also be a heterocyclic ring or alkyl group substituted with a heterocyclic ring. Such groups include furfuryl, tetrahydrofurfuryl and 1,3-dioxolanyl and substituted 1,3-dioxolanyl, e.g. groups of the formula:

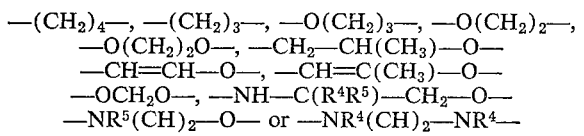

where the R$^{111}$ groups may be the same or different and are alkyl groups or hydrogen atoms and $n$ is 0 or an integer. The definition of Y as a heterocyclic ring or an alkyl group substituted with a heterocyclic ring is also intended to cover saccharide rings, e.g. when Y is a glucosyl or ribosyl group.

The R$_1$ group is preferably a hydrogen; a lower alkyl group such as a methyl, ethyl, propyl, or pentyl group; a lower alkoxy group derived from such alkyl groups; or an aryl group, such as a phenyl group. It is usually especially preferred that R$_1$ be hydrogen.

Preferred compounds of the invention are those wherein R$_1$ is hydrogen, there is one OY group present in the Q, R or T positions and that Y is an hydroxyalkyl, alkoxyalkyl, carboxyalkyl, alkoxy alkoxy alkyl, alkoxy hydroxy alkyl or phenoxyalkyl group (wherein the alkyl or alkoxy groups contain from 1 to 8 carbon atoms) and that the P and those of the Q, R and T groups which do not form the OY group are hydrogen; halogen (such as chlorine or bromine); lower alkyl groups (such as methyl, ethyl, propyl, pentyl or hexyl), the term lower being used herein to indicate that the alkyl or alkoxy groups contain from 1 to 8 carbon atoms; hydroxy; lower alkoxy groups (such as methoxy, ethoxy, propoxy, pentoxy); COOH or ester groups; nitro groups; primary, secondary or tertiary amino groups (such as lower alkyl amino, dilower alkyl amino or anilino groups); substituted lower alkyl groups carrying hydroxyl, alkoxy or halo substituents; or the fused ring substituents referred to above.

Particularly preferred compounds are those wherein the OY group is a hydroxy, lower alkoxy group such as a 2-hydroxypropoxy group, a lower carboxy alkoxy group such as a carboxymethoxy or a carboxy ethoxy group or an alkoxyalkoxy group, especially a methoxyethoxy, ethoxyethoxy, propoxypropoxy or butoxymethoxy group, and the other groups of P, Q and T are each hydrogen.

Accordingly, from a preferred aspect the invention provides compounds of the formula:

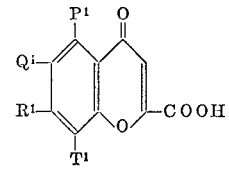

and functional derivatives thereof wherein P$^1$ is hydrogen; at least one of Q$^1$, R$^1$ and T$^1$ is a group OY wherein Y is a lower alkoxy lower alkyl, hydroxy loweralkyl or carboxyloweralkyl group; and the others of Q$^1$, R$^1$ and T$^1$ not forming OY groups are each hydrogen or alkyl.

It will be apreciated that certain of the above values of the P, Q, R, T, P', Q', R' and T' include groups which might be detrimentally affected by the reactants and/or reaction conditions used to introduce other groups or the desired

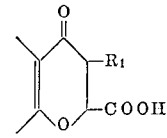

ring into the molecule. In such cases the affected group or site may be blocked or shielded, for example by alkylation, benzylation or acetylation, or by the blocking of the reactive site by a removable group, such as a cyano or nitro group. The reference to the values for the P, Q, R, T, P', Q', R' and T' groups is therefore to be construed herein and in the claims to include, where permissible, a shielded or blocked precursor or derivative of the desired value for the substituent.

Functional derivatives of the compound according to the invention include salts, notably water-soluble salts, esters and amides of one or more of the carboxylic acid functions present and esters of any hydroxylic functions present.

Salts of the compounds which may be mentioned are salts with physiologically acceptable cations, for example, ammonium salts; metal salts, such as alkali metal salts (e.g. sodium, potassium and lithium salts) and alkaline earth metal salts (e.g. magnesium and calcium salts); and salts with organic bases, e.g. amine salts such as a piperidine, triethanolamine and diethylaminoethylamine salts.

Esters which may be mentioned include simple alkyl esters derived from alcohols containing up to 10 carbon atoms, and esters derived from dialkylaminoalkanols such as a diethylaminoethyl ester. Amides which may be mentioned include simple amides derived from ammonia or primary or secondary aliphatic or aromatic amines, such as mono- or di-lower alkyl amines or aniline; and more complex amides derived from amino acids such as glycine.

The new compounds of the invention have been shown to inhibit the release and/or action of toxic products which arise from the combination of certain types of antibody and specific antigen, e.g. the combination of reaginic antibody with specific antigen. In man, it has been found that both subjective and objective changes which result from the inhalation of specific antigen by sensitised subjects are markedly inhibited by prior administration of the new compounds. Thus, the new compounds are of great value in the treatment of "extrinsic" allergic asthma. It has also been found that the new compounds are of value in the treatment of so-called "intrinsic" asthma (in which no sensitivity to extrinsic antigen can be demonstrated). The new compounds may also be of value in the treatment of other conditions in which antigen reactions are responsible for disease, for example, hay fever, urticaria and auto-immune diseases.

According to a further feature of the invention, therefore, there is provided a pharmaceutical composition comprising a compound of general Formula I, or a derivative thereof, preferably in the form of a salt, in association with a pharmaceutically acceptable carrier or diluent. There is also provided a process for the manufacture of such a pharmaceutical composition which comprises mixing a compound of the invention with a carrier or diluent.

The nature of the composition and the pharmaceutically acceptable carrier or diluent will, of course, depend upon the desired mode of administration, which may be for example orally; by inhalation; parenterally; or by topical application.

The composition may be formulated in the conventional manner with the customary ingredients. For example, the compositions may be put up as aqueous solutions or suspensions, as powders or in tablet, cream, lotion or syrup form.

The compounds of the invention find especial use when inhaled by the user, notably in the treatment of allergic asthma. For such use, the compounds of the invention, preferably in the form of a salt such as the sodium salt, are dissolved or suspended in water and may be applied by means of a conventional nebuliser. However, the administration of medicaments by means of a pressurised dispensing container, i.e. an aerosol dispenser, is an alternative to nebuliser administration. For administration from an aerosol dispenser, the medicament is dissolved or suspended in the liquefied propellant medium. Where the medicament is not soluble in the propellant, it may be necessary to add a surface-active agent to the composition in order to suspend the medicament in the propellant medium, and such surface-active agents may be any of those commonly used for this purpose, such as non-ionic surface-active agents. However, we prefer to use the anionic dialkyl sulphosuccinate or alkyl benzene sulphonate surface-active agents. The use of such surface-active agents and the advantages which stem therefrom are more fully described in British patent specification No. 1,063,512.

The compositions of the invention may also be administered in the form of powders by means of an insufflator device, such as that described in French patent specification 1,471,722. In order to improve the properties of the powder, it may be desired to modify the surface characteristics of the powder particles, for example by coating them with a pharmaceutically acceptable material such as sodium stearate. In addition, the fine particle sized powders may be mixed with a coarser diluent material such as lactose.

Whilst the inhalation of medicament has been described above with particular reference to oral administration, it will be appreciated that it may be desirable to administer the medicament nasally. The term inhalation is therefore used herein to denote, where the context permits, both oral and nasal administration.

The composition of the invention may also be administered as tablets, syrups and the like or by intradermal or intravenous injection in the conventional manner.

In addition to the internal administration, the compounds of the invention find use in compositions for topical application, e.g. as creams, lotions or pastes for use in dermatological treatments.

In addition to the compound of the invention and the ingredients required to present the compound in a form suitable for the selected mode of administration, we have found that other active ingredients may be present in the composition of the invention. Thus, in compositions for administration by inhalation, we have found that it is beneficial to include a bronchodilator. Any bronchodilator may, within reason, be used. Suitable bronchodilators include isoprenaline, adrenaline, orciprenaline, isoetharine and derivatives thereof, particularly the salts thereof. The use of isoprenaline sulphate is preferred. The amount of bronchodilator used will very over a broad range, depending, inter alia, upon the nature and activity of the bronchodilator and the compound of the invention used. However, the use of a minor proportion (i.e. less than 50% by weight) of the bronchodilator is preferred. The use of from 0.1 to 10% by weight of the bronchodilator based on the weight of the compound of the invention is particularly preferred.

From a further aspect, the invention therefore provides a composition which comprises a compound of the Formula I or a derivative thereof in admixture with a bronchodilator, which latter is preferably present in less than 50%, especially 0.1 to 10%, by weight of the former.

As indicated above, the compounds of the invention may be used to inhibit the effects of antibody-antigen reactions and are of especial use in the prophylactic treatment of allergic airway diseases. In such treatment the compound or composition of the invention is administered by the chosen method to the site of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a general guide, where the compounds are administered by inhalation to a patient suffering from acute allergic asthma, therapeutically useful results may be achieved when the compounds are administered at a dosage rate of from 0.1 to 50 mgs. Where the compounds are administered by the oral route, larger dosages may be given.

The invention thus also provides a method for inhibiting the effects of an antibody-antigen reaction which comprises the prior application to the known or expected area of the antibody-antigen reaction mechanism of a therapeutically effective amount of a compound or derivative of Formula I.

The compounds of the invention may be prepared by a number of methods. Moreover, the OY group may be introduced before or after conversion of a starting material into a chomone compound. The starting materials for present use will therefore be denoted by the general formula

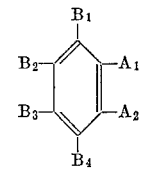

wherein one or more of $B_2$, $B_3$ or $B_4$ denotes an OY group or a group which may be converted thereto, the others denoting the Q, R, or T groups or precursors thereof; $B_1$ denotes a P group or precursor thereof; and $A_1$ and $A_2$ together form a chain, such as a $$-COCR_1=C(V)O-$$

or a $-COCHR_1-CH(D)-O-$ wherein V is a group convertible to a COOH group and D is a $COOR_6$, wherein $R_6$ is hydrogen or an alkyl group containing 1–10 carbon atoms, or a group V, convertible to the desired —$COCR_1=C(COOH)O$— chain, or $A_1$ and $A_2$ are a pair of groups convertible to the desired $$-COCR_1=C(COOH)O-$$

chain or to a chain convertible thereo.

As indicated above, the formulation of the OY group may take place before or after conversion of the $A_1$ and $A_2$ groups. However, it is preferred that the formation of the OY group take place before conversion of the $A_1$ and $A_2$ group. Where this has not been done, the product of the conversion of the $A_1$ and $A_2$ groups may be subjected to further treatment using conventional techniques to introduuce the OY group or groups. Thus, for example an OY group may be formed from an OH group by treatment with a compound HalY wherein Hal denotes a halogen, especially chlorine, in an inert solvent such as dioxan in the presence of an acid-binding agent such as potassium carbonate. Alternatively, an epoxide derivative of the desired Y group may be used, although the group introduced will contain at least one hydroxyl group and it may be necessary to treat the product further to obtain the desired OY group.

The conversion of the $A_1$ and $A_2$ groups to the desired —$COCR_1=C(COOH)O$— chain or derivative thereof may be achieved by a variety of methods. For example the desired

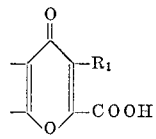

ring may be formed by cyclising compounds of the general formulae:

II

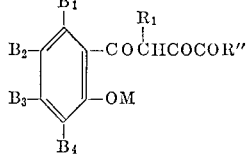

wherein R'' is an OH group or a group convertible thereto and M is hydrogen, an alkali-metal cation or an alkyl group;

III

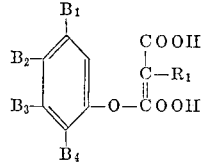

and

IV

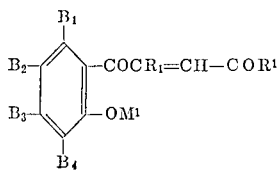

wherein $M^1$ is hydrogen or an alkali-metal cation, with oxidation or dehydrogenation of the product if required. The desired ring may also be formed by modification of an already formed chromone or chromanone ring [i.e. compounds wherein $A_1$ and $A_2$ together form the chain —CO—$CR_1$=C(V)—O— or

—CO—$CHR_1$—CH(D)—O—]

for example by oxidation of substituents in the 2-position of the ring, by dehydrogenation or by intra molecular rearrangement (for example by a Wesseley-Moser rearrangement).

The compounds of Formula II may be readily cyclised, for example by heating under non-basic conditions. It is preferred to carry out the cyclisation reaction in a non-reactive solvent such as ethanol or dioxane. It is also preferred to carry out cyclisation in the presence of a cyclisation catalyst, ideally an acid cyclisation catalyst such as a polyphosphoric acid, sulphuric acid, hydrochloric acid, acetic acid or mixtures thereof. When a compound is used wherein M is an alkyl group, simultaneous cyclisation and dealkylation may be achieved by the use of hydroiodic or hydrobromic acid as the cyclisation catalyst.

Cyclisation may be acrried out at from ambient temperature to about 100° C., for example by heating the reaction mixture on a steam bath and, where the nature of the reaction medium permits it, under atmospheric reflux.

As indicated earlier, the group R'' in the compound of Formula II is an OH group, or a group which is convertible to an OH group. Such conversion may have already occurred in the cyclisation of the compound or may have taken place prior to cyclisation. However, where this is not the case, such conversion may be readily achieved using conventional methods. Thus, amino or halogen groups may be hydrolised with a mild alkali, such as sodium carbonate, or an acid.

Alternatively, the R'' group may be converted into a more desirable derivative, for example an alkoxy group, and such further conversion is also within the scope of this invention.

The compounds of Formula II may themselves be prepared by a number of methods. For example, an acylbenzene of the formula:

V

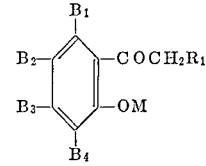

(wherein $R_1$ has the value given above and M is hydrogen, an alkali metal cation or an alkyl group, such as a lower alkyl group, e.g. a methyl, ethyl, propyl or pentyl group), may be condensed with a compound of the formula $R_7CZ$—$CZR_8$ wherein $R_7$ and $R_8$ may be the same or different, one being a group reactive with an hydrogen in the —CO—$CH_2R_1$ group of the acylbenzene, the other being an R'' group, and each Z is a carbonyl oxygen or one is an $(Hal)_2$ group wherein Hal is halogen. Suitable groups which react with a —CO—$CH_2R_1$ group include alkoxyl, amino, alkyl amino, substituted amino or substituted alkyl amino groups. It will be appreciated that these groups include groups which are also convertible to OH groups. Where $R_7$ and/or $R_8$ is a substituted amino group, the nitrogen atom may carry one or two groups E wherein E is a lower alkyl, a substituted or unsubstituted aryl, alkaryl or haloaryl group. In the case where the nitrogen carries only one group E the substituent may be linked to the nitrogen through a sulphur atom or an —SO— or —$SO_2$— group. Examples of suitable compounds for present use include those of the general formulae $$R_9OOC-COOR_9$$

(wherein each $R_9$ is an alkyl group, such as methyl, ethyl, propyl, butyl group, or pentyl group, an alkaryl group such as a benzyl group; or an alkenyl group such as an allyl group), and $R_9O$—$C(Hal)_2$—$COOR_9$ (wherein Hal is halogen, preferably chorine or bromine). Preferred compounds of fomua $R_7CZ$—$CZR_8$ for present include diethyloxalate, ethyl ethoxydichloroacetate, ethyl oxalylamide, ethyl oxalylanilide and ethyl oxalyl-p-toluene sulphonamide.

The condensation of the acylbenzene V with the compound of formula $R_7CZ$—$CZR_8$ may be carried out merely by mixing the reactants together and heating, if desired, to a temperature of from 25 to 150° C., preferably about 70 to 80° C. In the case of the oxalate esters, the reaction is desirably carried out in the presence of a condensation agent. Suitable agents include, for example, metal alkoxides, such as sodium ethoxide, sodium hydride, sodamide or metallic sodium. The condensation agent may be formed in situ, for example by the use of ethanol as the reaction medium and the addition of metallic sodium. In some cases the alkali metal salt of the compound of Formula V (that is when M is alkali metal) may act as part of the condensation agent required. Where a substituted dihalo-acetate is used, it is preferred to carry out the reaction in the presence of a finely divided metal catalyst, such as finely divided platinum group metal.

If desired, the reaction may be carried out in an inert solvent or diluent medium, such as diethyl ether, dioxane, ethanol, benzene, toluene, tetrahydrofuran, or mixtures thereof.

The reactants are conveniently employed in substantially stoichiometric proportions. If desired, an excess of either may be employed, for example in from 100 to 300 molar percent excess. When used, the condensation agent is desirably used in from 200 to 750 molar percent based on the amount of the acylbenzene of Formula V used, preferably from 200 to 500 molar percent.

It will be appreciated that the condensation reaction is desirably carried out under substantially anhydrous conditions, that is in the absence of initial or added water.

The reaction mixture of the above reaction will usually contain the compound of Formula II, or a precursor thereof, though in some cases cyclisation of the product to the compound of Formula I, or a salt or derivative thereof, may take place spontaneously. Cyclisation of the compound of Formula II may also be achieved in situ by acidifying the reaction mixture. It is usually preferred to recover the compound of Formula II from the reaction mixture and to cyclise it in the presence of a cyclisation agent under substantially anhydrous conditions as described above. The compound may be recovered from the crude reaction mixture wherein it was prepared by conventional techniques. Thus, for example, the reaction mixture may be treated with ether to precipitate the intermediate, if this precipitation had not already been achieved by the use of ether as the reaction medium. The precipitate, after any further washing with ether, may be dissolved in water and acidified to yield the compound of Formula II which usually separates out and may be recovered by, for example, filtration, centrifuging, or by extraction with a suitable solvent such as chlorofrom or ethyl acetate and evaporation of the slovent. It may be preferred to omit the ether precipitation step and merely acidify the reaction mixture and recover the product by solvent extraction.

The compound of Formula II may also be prepared by the reaction of an acylbenzene of Formula V wherein M is hydrogen or an alkali-metal cation with a dicarbonyl compound of formula $R_7COCOR_8$ wherein $R_7$ and $R_8$ have the values given above, except that one or both of $R_7$ and $R_8$ are halogen. Suitable dicarbonyl compounds for use in this case include oxalylchloride and compounds wherein $R_7$ is chlorine or bromine and $R_8$ is OH, alkoxy (e.g. methoxy or ethoxy), $NH_2$, a phenylamino or a p-toluene sulphonyl-amino group. The reaction using these halo compounds may be carried out in a manner similar to that described in relation to the use of the other compounds $R_7CZCZR_8$, except that an acid-binding agent is used in place of the condensation agent and that the use of an anhydrous organic solvent is desirable. Suitable acid-binding agents include alkalis, such as sodium or potassium carbonate, sodium, sodamide and alkali metal alkoxides; and organic amides such as pyridine or triethylamine. The acid-binding agent is present in at least the theoretically stoichiometric amount to bind all the halogen in the dicarbonyl compound. It may be desired to use an excess of acid-binding agent, and, if desired, the acid-binding agent may be added to the reaction mixture in a series of additions over a period of time. In some cases the acid-binding agent may be used as the reaction medium. The reaction mixture from this process will usually contain the intermediate product of the formula

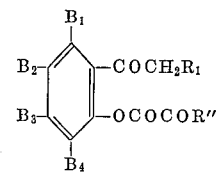

or a precursor or derivative thereof, though in some cases rearrangement of this intermediate to yield the compound of Formula II may have occurred spontaneously. Rearrangement of the intermediate may also be achieved in situ by the addition of an alkali and heating. However, it is usually preferred to recover the intermediate product from the reaction mixture and to rearrange it, after any purification that may be desired, in a separate reaction step. The recovery and purification of the intermediate product may be achieved by conventional methods.

Rearrangement of the intermediate product may be achieved by heating the crude, or purified, recovered material under non-acidic conditions and preferably in an inert solvent or diluent medium such as benzene, dioxan, anisole or the like. The non-acidic conditions may be achieved by the presence of a base, such as pyridine and potassium hydroxide or monoethylamine, or of an alkali, such as sodium carbonate or potassium carbonate, sodium hydride, sodium alkoxides e.g., sodium methoxide, or metallic sodium. If desired, the rearrangement may be carried out under the influence of heat, for example at from ambient temperature to 100° C., e.g. by heating on a steam bath and, where the reaction mixture permits it, under atmospheric reflux. Preferably the rearrangement is carried out under anhydrous conditions, i.e. in the absence of appreciable amounts of initial or added water. The amount of alkali present may be from 100 to 1000 molar percent, based on the amount of the intermediate product being rearranged and may, if desired, be added in a single addition or in a series of additions over a period of time.

The compound of Formula II or a derivative or precursor thereof, may be recovered from the reaction mixture in which it was formed by conventional methods with, if necessary, conversion of the R" group into a more desired substituent.

In a further process for preparing the compounds of Formula II, an appropriately substituted salicylic acid or ester thereof is reacted with a compound of the formula $CH_3COCOOR_9$ wherein $R_9$ has the values given above. The reaction is desirably carried out in an inert medium such as ethanol, anisole, benzene or dioxane and it is preferred to employ a condensation agent such as an alkali metal alkoxide (e.g. sodium ethoxide), sodamide, sodium hydride or metallic sodium.

The compounds of Formula III may be cyclised by treating the compound with a cyclisation agent at ambient temperature or above. Suitable cyclising agents include dehydrating agents such as phosphorous pentoxide, polyphosphoric acid, sulphuric acid, chlorsulphonic acid and other Lewis acids. In certain cases it is also possible to use glacial acetic acid containing a small amount of hydrochloric or hydrobromic acid. It will be appreciated that, since cyclisation is achieved in these cases by the use of dehydration agents, the presence of added or initial water in the reaction mixture is undesirable. It is usually preferred to subject the compounds of Formula III to an initial drying step and to carry out the cyclisation reaction under substantially anhydrous conditions.

Alternatively, cyclisation may be achieved by converting the free carboxyl groups of the compound of Formula III into acyl chloride groups, for example, by treatment with $PCl_3$ or $PCl_5$, and subjecting the resultant acyl chloride to an internal Friedel-Crafts reaction.

The compounds of Formula III when $R_1$ is hydrogen may be obtained by the reaction of the phenol of formula:

VI
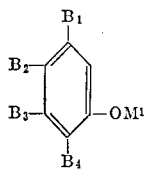

(wherein $M^1$ is hydrogen or an alkali metal cation) with an acetylene dicarboxylic acid or ester thereof under alkaline conditions to produce a product which, upon hydrolysis, yields the compound of Formula III. The acetylene dicarboxylic acid esters may be derived from alcohols having from 1 to 10 carbon atoms. However, since the ester moiety is to be eliminated, it is preferred to use simple esters derived, for example, from methyl, ethyl, propyl, or butyl alcohols. It is preferred that both carboxylic acid groups on the acetylene dicarboxylic acid be esterified. In this process the ester and phenol are reacted, preferably in approximately stoichiometric amounts, under alkaline conditions. These may be achieved by the presence of an organic base such as benzyl trimethyl ammonium hydroxide, or of an alkali metal hydroxide. However, it is convenient to have the alkali present in the form of an alkali metal salt, especially the sodium salt, of the reactant phenol, such a salt being considered as free phenol when assessing the amount of phenol present in the reaction mixture. Where this is done, the alkali metal phenate may conveniently be made in situ in the reaction mixture by the addition of metallic sodium. The alkali is believed to act catalytically and it is possible to use less than 100 molar percent thereof based on the phenol present. We prefer to use substantially 10 molar percent. It will be appreciated that the reaction, especially where the alkali metal phenate is formed in situ, is desirably carried out under substantially anhydrous conditions. It is also preferred to carry out the reaction in a solvent or diluent medium. Suitable media included, for example, excess of the reactant phenol, diphenyl ether, dioxane or anisole. These media have the advantage that the reaction may be carried out at elevated temperatures at atmospheric pressure. It is generally preferred to carry out the reaction at temperatures of from 50° to 100° C.

In place of the acetylene dicarboxylic acid ester used in the above process for the preparation of the compound of Formula III, an ester of a mono-halofumaric acid, or a precursor thereof may be used, i.e. esters of acids of the general formula

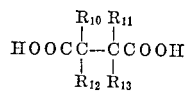

wherein $R_{12}$ is halogen and $R_{13}$ is an $R_1$ group when $R_{10}$ and $R_{11}$ together form a carbon to carbon bond; or, any two of $R_{10}$, $R_{11}$, $R_{12}$ and $R_{13}$ are halogen, one of the other two is hydrogen and the second is an $R_1$ group. In this case the reaction is not an addition reaction but a condensation reaction which involves at some stage the elimination of the elements of a halogen acid from between the phenol and the halofumaric acid ester. This acid must be eliminated from the system and the reaction is therefore carried out in the presence of at least sufficient of an acid-binding agent to eliminate the elements of the halogen acid which would be formed during the overall process. The elements of the halogen acid are not necessarily eliminated in one step, but may be eliminated firstly as a proton and then as a halogen anion. The term acid-binding agent is therefore used in this context to denote both conventional acid-binding agents, such as pyridine and triethylamine, and materials which eliminate, for example, first the hydrogen from the phenol (to form a phenate salt) and then are displaced from the phenate salt to form a salt with the halogen of the halofumaric acid ester. Apart from the use of a different acid ester reactant and the presence of the acid-binding agent, the process may be carried out in similar manner to that when an acetylene dicarboxylic acid ester is used. Since the acid-binding agent is usually also a strong alkali, there is generally no need to provide a separate strong alkali in the reaction mixture. As will be appreciated from the general formula for the acids which may be used to react with the phenol, the use of the mono-halofumaric acid or precursors thereof permits the introduction of an $R_1$ group into the molecule.

As indicated above, it is also possible to use compounds which yield the desired halofumaric acid esters under the conditions of the reaction with the phenol. Such other compounds or precursors include halomaleic acid esters and dihalosuccinic acid esters. When precursors are used, it may be necessary to provide extra alkali to ensure conversion of the precursor to the desired halofumaric acid ester. Such alkali may be merely an excess of the acid-binding agent.

The products obtained from the reactions outlined immediately above usually contain the compounds of Formula III in the form of their esters. The compounds of Formula III may be recovered from these products by acidification of the reaction mixture; subsequent hydrolysis of the esters by boiling with alkali and acidification to liberate the free acid; removal of organic solvent or diluent medium (if any); and extraction of the aqueous solution with, for example, ether which may thereafter be evaporated. The solvent extraction of the acid may be carried out as indicated, or may occur after hydrolysis of the ester of compound III if desired. The product may, if necessary, be subjected to further purification, for example by extracting the ethereal solution with sodium bicarbonate and then precipitating the acid of Formula III by addition of dilute sulphuric acid.

The compounds of Formula IV may be cyclised by treatment with an alkali or organic base in a suitable inert solvent to give the corresponding 2-carboxychlomanone. This may subsequently be converted into the corresponding 2-carboxychromone by heating with selenium dioxide or other suitable dehydrogenation agents, such as palladium black, in an inert solvent as is detailed below. Simultaneous oxidation and cyclisation to the desired 2-carboxychromone derivative may be brought about by the introduction of a suitable exidant into the cyclisation stage (e.g. selenium dioxide in an inert solvent using benzyltrimethylammonium hydroxide as the cyclising base).

Where non-oxidising conditions are used for the cyclisation step, the product will be the analogous chromanone compound from which the desired

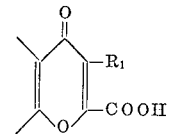

ring compound may be prepared as detailed later.

The compounds of Formula IV may be prepared by reacting an acylbenzene of Formula V wherein M is hydrogen or an alkali-metal cation with glyoxalic acid or an ester thereof in the presence of a base (e.g. aqueous sodium hydroxide) or a mineral acid. A water miscible solvent, e.g. alcohol, may be added to facilitate the reaction.

Alternatively a phenol of Formula VI wherein $M^1$ is hydrogen is heated at a temperature of, for example, 25 to 150° C. with maleic anhydride in a solvent or diluent medium, such as nitrobenzene or carbon disulphide, in the presence of a Lewis acid, such as an excess of aluminium trichloride. The complex which is produced by this process may then be decomposed with a dilute mineral acid, such as hydrochloric acid, and the solvent removed, for example by distillation. The residue, which contains the compound of Formula IV wherein R″ is OH, may be recovered using conventional techniques and then purified by, for example, recrystallisation. However, as indicated below the reaction may proceed to give a 2-carboxychromanone directly without isolation of an intermediate.

In the processes outlined above, we believe that the compounds II to IV are all necessary intermediates in the conversion of the various starting materials to the compounds of Formula I. However, in many cases the intermediates are formed under those conditions required to achieve cyclisation and therefore exist only transitorily. Whilst, for clarity, these processes have been described as if the compounds II to IV were necessarily isolated prior to cyclisation, the invention embraces those processes wherein the intermediate undergoes cyclisation without separation or isolation from the reaction mixture in which it has been prepared.

As indicated above, the desired

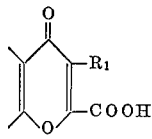

ring may also be formed from an already persent chromone ring, i.e. from a compound of formula (VII)
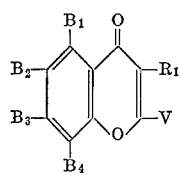

wherein V is a group which is convertible to a —COR$_6$ group. Examples of suitable V groups include nitrile and ester groups which may be hydrolised to a carboxylic acid group; alkyl or substituted alkyl groups such as methyl, hydroxymethyl, halomethyl (e.g. chloromethyl, bromethyl, dichloromethyl, trichloromethyl), acyl groups such as formyl or acetyl groups, and alkenyl and aryl alkenyl groups such as vinyl, ω-trichlorovinyl and styryl groups, all of which are groups oxidisable or hydrolysable to a carboxylic acid group. The conversion of the V group to a COOH group or derivative thereof may be achieved using any of the known methods.

The compounds of Formula VII may be prepared by a variety of methods, many of which are closely analogous to the processes described above for the preparation and cyclisation of the compounds of Formulae II to IV except that in place of the starting materials II, III and IV, compounds of the formulae VIII
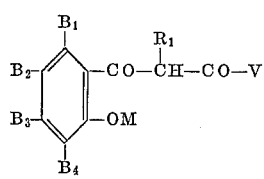

IX
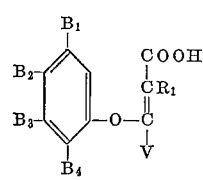

and
X
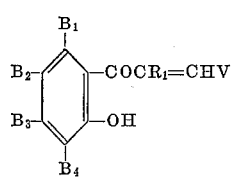

are used and that the final product requires conversion of the V group to the —COOH group or derivative thereof. Such analogous processes may together be broadly described as a process for preparing a compound of Formula I by conversion of a compound of the formula

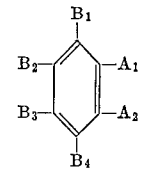

(wherein A$_1$ and A$_2$ are the pairs of groups

—COCHR$_1$COD and OM; H and —O—C(D)=CR$_1$COOH; or

—COCR$_1$=CHD and OM$^1$ respectively wherein D is a COOR$_6$ group or a group V convertible thereto, M is H, an alkali-metal cation or an alkyl group, M$^1$ is H or an alkali metal cation and R$_1$ and R$_6$ have the values given above; and B$_1$ to B$_4$ have the values given above; followed, if necessary, by conversion of a group in a B$_2$, B$_3$ or B$_4$ position to the desired OY group.

Thus the compounds of Formula VII may be prepared by cyclising a compound of Formula VIII under the conditions described above for the cyclisation of the compound of Formula II. In some instances cyclisation may occur spontaneously.

The compounds of Formula VIII may themselves be prepared by condensing an acylbenzene of Formula V with a compound of formula VCOR$_7$, wherein V has the values given above and R$_7$ is a group reactive with a hydrogen in the —COCH$_2$R$_1$ group of the acylbenzene. Suitable compounds VCOR$_7$ include esters of substituted or unsubstituted acetic, acrylic and cinnamic acids, and the like, and amides or substituted amides. The condensation may be achieved by the method outlined earlier for the production of the compounds of Formula II from the acylbenzene V and the compounds ·R$_7$CZ—CZR$_8$.

The compounds VIII may also be prepared from the acylbenzene V and the compounds VCOR$_7$ wherein R$_7$ is halogen via, if necessary, the rearrangement of a compound of the formula:

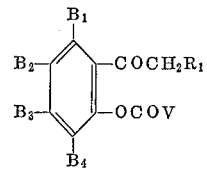

using conditions similar to those set out above for the preparation of the compounds of Formula III by the analogous route.

Particular examples of the preparation of compounds VIII include the preparation of those compounds wherein V is a methyl or vinyl group by reaction of an alkyl acetate or acrylate, i.e. the compounds VCOR$_7$ wherein V is a methyl or vinyl group and R$_7$ is an alkoxy group, with an acylbenzene V under the condensation conditions outlined above for the preparation of compound II.

The 2-styryl compound, that is the compound of Formula VIII wherein V is

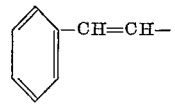

may be prepared from the acylbenzene V by reaction with sodium cinnamate and cinnamic anhydride or by reaction with a cinnamoyl halide, e.g. cinnamoyl chloride, in the presence of an acid-binding agent to yield the cinnamate ester of the acylbenzene, followed by rearrangement with a base, e.g. potassium carbonate, in the presence of an inert solvent such as toluene or benzene, to give a 1,3-diketone of the formula:

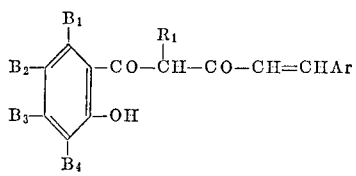

wherein Ar denotes a benzene ring.

From these examples of the preparation of the compounds of Formula VIII it will be appreciated that certain of the processes for preparing the compounds of Formulae II and VIII may together be broadly described as processes wherein an acylbenzene of Formula V is reacted with compound

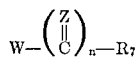

wherein $R_7$ is a group reactive with a hydrogen in the —$COCH_2R_1$ group of the acylbenzene, each Z is O or one may be a $(Hal)_2$ group, $n$ is 1 or 2 and when $n$ is 1, W is a D group i.e. a $COOR_6$ group or a group V convertible thereto and when $n$ is 2, W is an R″ group, i.e. an OH group or a group convertible thereto.

The compounds of Formula IX may be prepared by the reaction of a phenol of Formula VI with a substituted acetylene monocarboxylic acid, or ester in manner similar to that used to prepare the compounds of Formula III above. The acetylene monocarboxylic acids, or esters thereof, for present use have the general formula $$VC \equiv C\text{—}COOR_6$$

wherein V and $R_6$ have the values given above. It is preferred that $R_6$ be a lower alkyl group such as a methyl or ethyl group. It is also possible to use precursors of acetylene monocarboxylic acids or esters, for example the mono-halo-ethylenic and dihalo-ethane analogues thereof.

The compounds of Formula IX may be cyclised in a manner similar to that employed with the compounds of Formula III.

As with the compounds of Formulas II and VIII, the preparation of the compounds of Formulas III and IX may together be broadly described as a process wherein a phenol of Formula VI is reacted with a compound of the formula

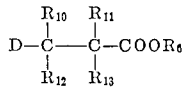

wherein $R_6$, $R_{10}$, $R_{11}$, $R_{12}$, $R_{13}$ and D have the values given above and also the further value that when $R_{10}$ and $R_{11}$ together form a carbon to carbon bond, $R_{12}$ and $R_{13}$ may also form a carbon to carbon bond.

The compounds of Formula X may also be prepared and cyclised in a manner similar to that used to prepare and cyclise the compound of Formula IV. Thus, an acylbenzene of Formula V may be reacted with an aldehyde of the formula OHCV, for example cinnamaldehyde, under substantially the same conditions as are used to prepare the compound of Formula IV from glyoxallic acid. However, it may be preferred to employ acylbenzenes of Formula V wherein M is an alkyl group and to dealkylate the reaction product to obtain the compound of Formula X.

As with the other intermediate compounds, certain routes for the preparation of the compounds of Formula IV and X may together be broadly described as comprising the reaction of an acylbenzene of Formula V with a compound of the formula OHCD wherein D has the values given above.

In addition to producing the compounds of Formula VII by the methods outlined above, a number of other methods may be readily devised which do not necessarily pass through the intermediate compounds VIII, IX or X. Thus, the 2-formyl compound may be prepared by the reaction of an acylbenzene of Formula V with a substituted acetic acid or ester thereof of the formula $$(R_6O)_2CH\text{—}COOR_6$$

for example ethyl diethoxy acetate. In this case an acetal compound is produced as an intermediate, which may be hydrolised with, for example, a dilute mineral acid to yield the desired —CHO group. Other routes which may be specified include: the condensation of a diketene with an appropriate enamine; the rearrangement of a coumarin in the presence of alcoholic hydrochloric acid; the condensation of an alkyl alkoxalylacetate with an appropriate phenol or resorcinol in the presence of phosphorus pentoxide.

In addition to the direct conversion of a compound of Formula VII into the desired compound of Formula I, the V group in compounds of Formula VII may be converted in known manner from one form of substituent into another more preferred substituent.

Thus, the compound of Formula VII wherein V is a methyl group also serves as an intermediate in the preparation of a number of other oxidisable derivatives. For example, the methyl group may be converted into the corresponding 2-halomethyl compound, e.g. by reaction with hydrogen chloride and manganese dioxide in boiling acetic acid to produce the 2-chloromethyl compound; or by reaction with bromine in acetic acid to yield the 2-bromoethyl compound. The 2-halomethyl compound may be oxidised to the corresponding 2-carboxylic acid using, for example, chromium trioxide as oxidising agent in the presence of acetic acid.

The 2-methyl compound may also be reacted with p-nitrosodidimethylaniline and the reaction product hydrolysed with dilute mineral acid to give the corresponding 2-formyl compound which may be oxidised to the corresponding 2-carboxylic acid using, for example, chromium trioxide as reagent.

Condensation of the 2-methyl compound with a benzaldehyde in the presence of condensation catalyst gives the 2-styryl compound which may be oxidised to the corresponding 2-carboxylic acid using, for example, potassium permanganate. The 2-formyl compound may also serve as a starting point for the preparation of the 2-cyano compound. Thus, the 2-formyl compound may be reacted with hydroxylamine to yield the 2-oximino compound which may, after dehydration to give the 2-cyano compound, be hydrolysed to the 2-carboxylic acid or amide thereof, under acid conditions.

As stated earlier the compounds of Formula I may also be prepared by conversion of a chain $$\text{—}CO\text{—}CHR_1\text{—}CH(D)\text{—}O\text{—}$$

to the desired —CO—$CR_1$=C(COOH)O— chain. This conversion may go via a compound of Formula VII when the group D is a group V, or may proceed directly to the compound of Formula I or a derivative thereof. Thus, the compounds of Formula I may also be prepared from corresponding chromanone compounds by dehydrogenation followed, or preceded, by oxidation or hydrolysis of any substituent in the 2-position if this is necessary. The dehydrogenation may be effected by, for example, the use of selenium dioxide, palladium black or chloranil. Alternatively, dehydrogenation may be carried out by bromination followed by dehydrobromination. Thus, the chromanone be brominated using N-bromosuccinimide in an inert solvent or by treatment with pyridinium perbromide in an inert solvent, such as chloroform, in the presence of a free radical catalyst, such as benzoyl peroxide, to yield the 3-bromo derivative which may be subsequently dehydrobrominated. The chromanones themselves may be obtained by the action of an ω-substituted ω-chloropionic acid or derivative thereof on resorcinol in the presence of a basic reagent, followed by conversion of the acid function to the acid chloride and treatment with aluminium chloride in the presence of a suitable solvent (e.g. nitrobenzene); or by the action of a phenol on a β-substituted acrylonitrile, e.g. propionitrile, with subsequent hydrolysis and cyclisation of the product. As indicated above, cyclisation of the intermediates IV and X may lead to the production of a corresponding chromanone compound, which may then be converted as outlined above to the desired chromone compound.

In addition to the above outlined methods for preparing the compounds of Formula I via the intermediates II to IV and VII to X, other methods may be devised which do not necessarily produce any of these intermediates. Thus, an acetylhalide, acetic anhydride or acetic acid may be condensed with an oxalate ester of the type

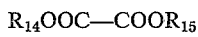

wherein $R_{14}$ is an aryl group and $R_{15}$ is an alkyl or an aryl group, the condensation being carried out in the presence of a Lewis acid. The oxalate ester may itself be obtained by the esterification of a phenol of Formula VI with the appropriate oxalyl halide. Alternatively the compounds of Formula I may be obtained by reacting a phenol of Formula VI with ethyl ethoxalyl acetate and subsequently cyclising the product, if necessary, e.g. by heating a solvent medium. In a further process a 2-carboxypyrone of the formula

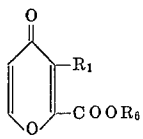

is reacted with a furan of the formula

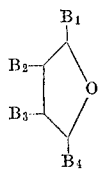

to yield the intermediate

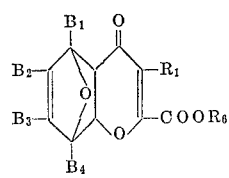

which may be converted, for example by dehydration, to the compound.

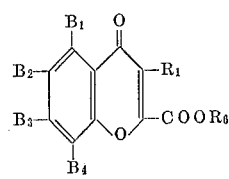

From the above examples of the conversion of the starting materials

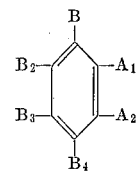

into the desired

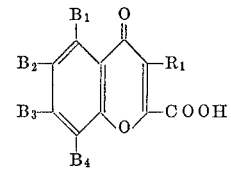

compounds, it will be seen that many of these routes may be together broadly described as the conversion of compounds wherein $A_1$ and $A_2$ together form the groups —OM and —H, —D or —COJ; —H and —OCD=CR$_1$COOR$_6$; —OCOCOR″ and H or COCH$_2$R$_1$ respectively wherein J is a group —CH$_2$R$_1$, —OR$_6$, —CHR$_1$COD or CR$_1$=CHD and R″, R$_1$, R$_6$ D and M have the values given above; or wherein $A_1$ and $A_2$ together form the chains —OCR$_1$=C(D)O— or

—OCHR$_1$—CH(D)O—

$B_1$, $B_2$, $B_3$ and $B_4$ having the values set out above, followed, if necessary, by conversion of a group in a $B_2$, $B_3$ or $B_4$ position to the desired OY group.

The processes outlined above may produce the free acids of Formula I or may yield derivatives thereof. It is also within the scope of the present invention to treat the product of any of the above processes, after any isolation and purification steps that may be desired, in order to liberate the free acid therefrom or to convert one form of derivative into another. The methods used to free the acid, convert one derivative into another and to isolate and purify any product may be those conventionally used. Thus, salts may be prepared by the use of alkaline conditions during the recovery and purification of the compound. Alternatively, the free acid may be obtained and subsequently converted to a desired salt by neutralisation with an appropriate base, e.g. an organic amine, or alkali such as an alkali metal or alkaline earth metal hydroxide, carbonate or bicarbonate, preferably a mild base or alkali such as sodium carbonate or bicarbonate. Where the compound is recovered in the form of a salt this salt may be converted to a more desirable salt, for example by a metathetical process. The esters may be obtained as a result of having used appropriate starting materials, for example by the reaction of a dialkyl oxalate with an acylbenzene of Formula V as hereinbefore described; or may be formed by the reaction of an appropriate alcohol, alkyl sulphate or halo- compound with free carboxyl groups in the compound. Alternatively transesterification techniques may be used to exchange one ester group for another. The amides may be readily obtained, for example, by dehydration of the ammonium salt or by reaction of the free carboxyl groups in the compound with an appropriate amino compound such as a primary, secondary or tertiary amine or an amino acid.

The invention will be illustrated by the following examples, in which all parts and percentages are by weight unless otherwise stated.

EXAMPLE 1

A slurry of 15.2 parts of resacetophenone in 36.5 parts of diethyl oxalate was run into an ice-cooled solution of sodium ethoxide (prepared from 2.01 parts of sodium and 25 parts of ethanol) and 25 parts of diethyl ether with stirring. The slurry was washed in with 30 parts of diethyl ether and the mixture was heated under gentle reflux for 4 hours.

After cooling, diethyl ether and water were added and the aqueous layer was separated off and acidified with dilute hydrochloric acid. The aqueous solution was then extracted with chloroform, and the chloroform extract dried over sodium sulphate, filtered and evaporated to leave a red oil. The oil was heated under reflux with ethanol and 0.5 part of concentrated hydrochloric acid for 10 minutes to give 14.0 parts of ethyl 7-hydroxychromone-2-carboxylate which crystallised as orange needles, melting point 226–228° C.

*Analysis.*—Found (percent): C, 61.49; H, 4.39. $C_{12}H_{10}O_5$ requires (percent): C, 61.60; H, 4.28.

A mixture of 4.68 parts of ethyl 7-hydroxychromone-2-carboxylate, 4.59 parts of 2-ethoxyethyl bromide, 4.14 parts of potassium carbonate and 100 parts of acetone was heated under reflux for 20 hours.

The acetone was filtered while still hot and the solid residue was washed with hot acetone. The acetone was evaporated off to leave a yellow oil which crystallised on cooling. This solid was recrystallised from ethanol, with charcoaling, to give 1.82 parts of ethyl 7-(2-ethoxyethoxy) chromone-2-carboxylate as colourless needles, melting point 86–7° C.

*Analysis.*—Found (percent): C, 62.5; H, 6.0. $C_{16}H_{16}O_6$ requires (percent): C, 62.74; H, 5.92.

To a solution of 1.62 parts of ethyl 7-(2-ethoxyethoxy) chromone-2-carboxylate in 50 parts of hot ethanol was added a hot solution of 0.21 part of sodium hydroxide in 25 parts of ethanol. The mixture was heated under reflux for 20 minutes.

On cooling, diethyl ether was added and a colourless oil separated out. The oil was extracted into water, and the aqueous solution was acidified with dilute hydrocholoric acid and left overnight at 0.5° C. to give 1.17 parts of 7-(2-ethoxyethoxy) chromone-2-carboxylic acid which crystallised as a colourless solid, melting point 171–3° C.

*Analysis.*—Found (percent): C, 60.5; H, 5.04. $C_{14}H_{14}O_6$ requires (percent): C, 60.43; H, 5.07.

A mixture of 1.0 part of 7-(2-ethoxyethoxy) chromone-2-carboxylic acid and 0.3 part of sodium bicarbonate was dissolved in 20 parts of water. The solution was then charcoaled and freeze-dried to yield 1.0 part of sodium 7-(2-ethoxyethoxy) chromone-2-carboxylate as a white powder.

EXAMPLE 2

To a stirred solution of sodium ethoxide in ethanol (prepared from 4.05 parts of sodium and 40 parts of ethanol), was added a mixture of 8.11 parts of 2,4-dihydroxy-3-methylacetophenone and 16.06 parts of diethyl oxalate in 50 parts of diethyl ether, using the same conditions as in Example 1, to give 6.68 parts of ethyl 7-hydroxy-8-methylchromone - 2 - carboxylate, as buff-coloured needles, melting point 258–60° C.

*Analysis.*—Found (percent): C, 63.1; H, 4.80. $C_{13}H_{12}O_5$ requires (percent): C, 62.9; H, 4.87.

To a mixture of 3.0 parts of ethyl 7-hydroxy-8-methylchromone-2-carboxylate, 4.64 parts of propylene oxide and 0.2 part of benzyltrimethylammonium hydroxide were added 20 parts of dioxan, and the mixture was heated at 100° C. for 16 hours in a sealed vessel.

The resulting solution was diluted with a mixture of diethyl ester and light petroleum (boiling range 40–60° C.) to give a yellow oil which, on trituration with light petroleum, gave ethyl 7-(2-hydroxypropoxy)-8-methylchromone-2-carboxylate as a gummy solid. This solid was then hydrolysed as in Example 1 to yield 1.26 parts of 7-(2-hydroxypropoxy)-8-methylchromone-2-carboxylic acid as a cream coloured solid, melting point 240–242° C.

*Analysis.*—Found (percent): C, 59.9; H, 5.01. $C_{14}H_{14}O_6$ requires (percent): C, 60.4; H, 5.07.

The sodium salt was prepared as in Example 1 using 1.1 parts of 7-(2-hydroxypropoxy)-8-methylchromone-2-carboxylic acid and 0.34 part of sodium bicarbonate to give 1.0 part of sodium 7-(2-hydroxypropoxy)-8-methylchromone-2-carboxylate as a colourless solid.

EXAMPLE 3

To 4.68 parts of ethyl 7-hydroxychromone-2-carboxylate (prepared as in Example 1), 4.64 parts of propylene oxide and 0.2 part of benzytrimethylammonium hydroxide were added 20 parts of dioxan, and the mixture was heated at 100° C. for 16 hours in a sealed vessel.

After cooling, diethyl ether was added and the supernatant liquid was decanted from the precipitated yellow oil. Light petroleum (boiling range 40–60° C.) was added to the decanted dioxan-diethyl ether solution and, on standing for 72 hours at 0–5° C., 3.3 parts of ethyl 7-(2-hydroxypropoxy) chromone-2-carboxylate were obtained as a colourless solid, melting point 94–95° C.

*Analysis.*—Found (percent): C, 61.2; H, 5.42. $C_{15}H_{16}O_6$ requires (percent): C, 61.64; H, 5.52.

The hydrolysis of the ethyl 7-(2-hydroxypropoxy) chromone-2-carboxylate was carried out by the procedure of Example 1 using 3.3 parts of ethyl 7-(2-hydroxypropoxy) chromone-2-carboxylate and 0.45 part of sodium hydroxide to give 2.1 parts of 7-(2-hydroxypropoxy) chromone-2-carboxylic acid as a colourless solid, melting point 223–226° C.

*Analysis.*—Found (percent): C, 58.8; H, 4.4. $C_{13}H_{12}O_6$ requires (percent): C, 59.1; H, 4.58.

The sodium salt was prepared as in Example 1 using 1.94 parts of 7-(2-hydroxypropoxy) chromone-2-carboxylic acid and 0.62 part of sodium bicarbonate to give 1.41 parts of sodium 7-(2-hydroxypropoxy) chromone-2-carboxylate.

EXAMPLE 4

A mixture of 3.47 parts of ethyl 7-hydroxy-8-methylchromone-2-carboxylate (prepared as in Example 2), 3.2 parts of 2-ethoxyethyl bromide and 2.7 parts of potassium carbonate in 75 parts of acetone were allowed to react in the manner of Example 1 to yield 0.5 part of ethyl 7-(2-ethoxyethoxy)-8-methylchromone-2-carboxylate, melting point 92° C., crystallised as colourless needles from ethanol.

*Analysis.*—Found (percent): C, 63.0; H, 6.18. $C_{17}H_{20}O_6$ requires (percent): C, 63.7; H, 6.29.

The hydrolysis of the ethyl 7-(2-ethoxyethoxy)-8-methylchromone-2-carboxylate was carried out as in Example 1 using 0.32 part of ethyl 7-(2-ethoxyethoxy)-8-methylchromone-2-carboxylate and 0.04 part of sodium hydroxide in ethanol to yield 0.3 part of 7-(2-ethoxyethoxy)-8-methylchromone-2-carboxylic acid, melting point 210–2° C., as a colourless solid.

*Analysis.*—Found (percent): C, 60.8; H, 5.33. $C_{15}H_{16}O_6$ requires (percent): C, 61.6; H, 5.52.

The sodium salt was prepared as in Example 1 using 0.15 part of 7-(2-ethoxyethoxy)-8-methylchromone-2-carboxylic acid and 0.04 part of sodium bicarbonate to give 0.13 part of sodium 7-(2-ethoxyethoxy)-8-methylchromone-2-carboxylate as a yellow solid.

EXAMPLE 5

A mixture of 21.5 parts of 2,5-dihydroxyacetophenone, 23.8 parts of 2-ethoxyethyl bromide, 9.75 parts of potassium carbonate, 0.5 part of potassium iodide and 100 parts of dimethyl formamide was heated with stirring at 100° C. for 66 hours. After cooling, the mixture was diluted with water and extracted with diethyl ether. An insoluble residue was shown to consist of 4.53 parts of 2,5-dihydroxyacetophenone. The diethyl ether extract was washed with water, dried over sodium sulphate, filtered, and evaporated to leave a mixture of solid and oil. The solid was shown to consist of 2.8 parts of 2,5 dihydroxyacetophenone, and the oil was distilled. The distillate having a boiling range of 158–164° at 2.5 mm. pressure was extracted with light petroleum and the petroleum extract was dried, filtered and evaporated to give 7.1 parts of 5-(2-ethoxyethoxy)-2-hydroxyacetophenone, melting point 34–36° C.

*Analysis.*—Found (percent): C, 64.2; H, 7.03. $C_{12}H_{16}O_4$ requires (percent): C, 64.3; H, 7.19.

A mixture of 5 parts of 5-(2-ethoxyethoxy)-2-hydroxyacetophenone in 32 parts of warm diethyl oxalate was added to a solution of 3.5 parts of sodium in 40 parts of ethanol. The mixture was heated on the steam bath with stirring for 30 minutes, cooled, acidified with aqueous acetic acid, and transferred to a separating funnel. The solution was extracted with chloroform and the chloroform extract was washed with 10% sodium bicarbonate solution, water, and dried over sodium sulphate. After filtration and removal of the solvent the residual oil was dissolved in 16 parts of ethanol, and 0.3 ml. of concentrated hydrochloric acid was added. The solution was heated on the steam bath for 10 minutes, filtered, and allowed to stand. The product, consisting of 3.4 parts of ethyl 6-(2-ethoxyethoxy) chromone-2-carboxylate, melting point 109–110° C., was obtained as needles.

*Analysis.*—Found (percent): C, 62.6; H, 5.69. $C_{16}H_{18}O_6$ requires (percent): C, 62.7; H, 5.92.

A mixture of 2.63 parts of ethyl 6-(2-ethoxyethoxy) chromone-2-carboxylate and 3.5 parts of sodium bicarbonate in 40 parts of water was heated in the steam bath for 1 hour. The solution was coled, filtered, and acidified with hydrochloric acid. The crude product was crystallised from ethanol with charcoaling to give 1.82 parts of 6-(2-ethoxyethoxy)-chromone-2-carboxylic acid, melting point 215–216.5° C.

*Analysis.*—Found (percent): C, 61.0; H, 5.04. $C_{14}H_{14}O_6$ requires (percent): C, 60.4; H, 5.07.

The preparation of sodium 6-(2-ethoxyethoxy) chromone-2-carboxylate was carried out by the procedure of Example 1 using 6-(2-ethoxyethoxy) chromone-2-carboxylic acid and an equimolar amount of sodium bicarbonate.

EXAMPLE 6

A solution of 5 parts of resacetophenone in 12 parts of 33% w./v. sodium hydroxide solution was treated with 7 parts of 50% w./v. aqueous chloracetic acid. The mixture was heated on a steam bath for 30 minutes, cooled and acidified with concentrated hydrochloric acid. The precipitated solid was extracted with cold aqueous sodium bicarbonate solution and filtered. On acidifying the filtrate, a solid was deposited which was filtered off and recrystallized from water to give 3.5 parts of 3-hydroxy-4-acetophenoxyacetic acid, melting point 160–161° C.

*Analysis.*—Found (percent): C, 57.2; H, 4.62. $C_{10}H_{10}O_5$ requires (percent): C, 57.14; H, 4.8.

A slurry of 16 parts of 3-hydroxy-4-acetophenoxyacetic acid in 28 parts of diethyl oxalate was added to a stirred solution of 25 parts of sodium ethoxide in 100 parts of diethyl ether. The mixture was stirred for 15 hours and 150 parts of diethyl ether were added. The mixture was extracted with 4 lots of 250 parts of water and the aqueous extract was acidified with concentrated hydrochloric acid and extracted with 4 lots of 150 parts of chloroform. The chloroform was then distilled off and the residual oil was treated with 30 parts of ethanol and 5 parts of concentrated hydrochloric acid and heated under reflux for 1 hour. The ethanol was then distilled off and the residue was heated under reflux with 30 parts of saturated aqueous sodium bicarbonate solution for 1 hour. The solution was then filtered and, on acidifying, gave 4.6 parts of 7-carboxymethoxychromone-2-carboxylic acid, melting point 310° C.

*Analysis.*—Found (percent): C, 54.5; H, 3.25. $C_{12}H_8O_7$ requires (percent): C, 54.55; H, 3.05.

To a solution of 1.6 parts sodium bicarbonate in 20 parts of water were added 2.6 parts of 7-carboxymethoxychromone-2-carboxylic acid and the resultant mixture was filtered. The filtrate was freeze-dried to give 2.9 parts of the disodium salt of 7-carboxymethoxychromone-2-carboxylic acid.

EXAMPLE 7

A mixture of 5.0 parts of 2,3-dihydroxyacetophenone, 15 parts of dioxan, 1.91 parts of propylene oxide and 0.15 part of benzyltrimethylammonium hydroxide was heated in a sealed container, at 100° C. for 16 hours.

The dioxan was removed under vacuum and the remaining oil was extracted with diethyl ether. Evaporation of the diethyl ether gave 4.13 parts of 2-hydroxy-3-(2-hydroxypropoxy)acetophenone, melting point 73–4° C.

To a stirred solution of sodium ethoxide in ethanol (prepared from 1.6 parts of sodium in 16 parts of ethanol) was added a mixture of 3.6 parts of 2-hydroxy-3-(2-hydroxypropoxy)-acetophenone and 6.6 parts of diethyl oxalate in 20 parts of diethyl ether, using the same conditions as in Example 1, to yield 0.95 part of ethyl 8-(2-hydroxypropoxy)-chromone-2-carboxylate, melting point 105–6° C.

*Analysis.*—Found (percent): C, 61.4; H, 5.48. $C_{15}H_{16}O_6$ requires (percent): C, 61.64; H, 5.52.

To a solution of 0.95 part of ethyl 8-(2-hydroxypropoxy)-chromone-2-carboxylate in boiling ethanol were added 3 parts of 1.15 N sodium hydroxide in ethanol. A solid separated immediately.

Water was added until the solid dissolved, the solution was treated with charcoal, filtered and distilled with benzene to remove the water as an azotrope. There resulted 0.75 part of sodium 8-(2-hydroxypropoxy) chromone-2-carboxylate monohydrate.

*Analysis.*—Found (percent): C, 50.8; H, 4.24. $C_{13}H_{11}NaO_6H_2O$ requires (percent): C, 51.3; H, 4.28.

EXAMPLE 8

To a solution of 30 parts of quinacetophenone and 18 parts of sodium hydroxide in 65 parts of water was added a solution of 21 parts of chloroacetic acid in 20 parts of water. The mixture was heated on a steam-bath for 25 minutes, then it was cooled and acidified with concentrated hydrochloric acid. The precipitated solid was filtered off and extracted with sodium bicarbonate solution and the resulting solution was re-acidified with concentrated hydrochloric acid. A solid was precipitated, which was filtered off, washed with water then crystallised from water to give 24 parts of 3-acetyl-4-hydroxyphenoxyacetic acid, melting point 145° C.

*Analysis.*—Found (percent): C, 56.8; H, 4.69. $C_{10}H_{10}O_5$ requires (percent): C, 57.1; H, 4.80.

To a stirred solution of 7.5 parts of metallic sodium in 75 parts of ethanol and 75 parts of ether was added a slurry of 16 parts of 3-acetyl-4-hydroxyphenoxyacetic acid in 30 parts of diethyl oxalate. The mixture was stirred for 18 hours, then it was diluted with 150 parts of ether and extracted with 4 lots of 250 parts of water. The aqueous extract was washed with 40 parts of ether, then it was acidified with concentrated hydrochloric acid and extracted with 4 lots of 150 parts of chloroform. The chloroform extract was evaporated to leave a red oil, which was treated with 20 parts of glacial acetic acid and 5 parts of concentrated hydrochloric acid and the resulting mixture was heated on a steam-bath for 2 hours, then left overnight. The mixture was diluted with 50 parts of water and a solid was precipitated, which was filtered off, washed with water and dried in an oven to leave 2.4 parts of 6-carboxymethoxychromone-2-carboxylic acid melting point, 288–90° C.

*Analysis.*—Found (percent): C, 54.5; H, 3.18. $C_{12}H_8O_7$ requires (percent): C, 54.5; H, 3.05.

The disodium salt was prepared and freeze-dried as in Example 1, using 1.3 parts of 6-carboxymethoxychromone-2-carboxylic acid and 0.84 part of sodium bicarbonate.

EXAMPLE 9

A solution of 8.4 parts of 4-hydroxyphenoxyacetic acid in 40 parts of dioxan was treated with 1.5 parts of metallic sodium and the mixture was stirred and heated until the sodium had dissolved. The stirred mixture was then treated with a solution of 7.5 parts of dimethylacetylenedicarboxylate in 10 parts of dioxan and heated on a steambath for 30 minutes. To the mixture was then added 35 parts of 25% sodium hydroxide solution. After heating on a steam-bath for 1 hour, the mixture was cooled and extracted with ether, then acidified with 20% sulphuric acid. The aqueous solution was thoroughly extracted with ether. Evaporation of the ether left 12.5 parts of a sticky-semi-solid.

4 parts of the sticky solid were cautiously dissolved in 35 parts of chlorosulphonic acid. The solution was allowed to stand for 10 minutes, then it was carefully diluted with 38 parts of concentrated sulphuric acid, swirled until frothing had ceased and heated at 50° for a few minutes. The mixture was cooled and carefully poured on to 250 parts of ice. On standing, a fine precipitate slowly settled and was filtered off, washed with water and dried to leave 0.5 part of 6-carboxymethoxychromone-2-carboxylic acid melting point, 282–6° C., which was identified by infra-red spectroscopy. The melting point of a mixture of the 6-carboxymethoxychromone-2-carboxylic acids produced by the process of Example 8 and this example was 284–8° C.

EXAMPLE 10

A solution of 5-(2-ethoxyethoxy)2-hydroxy acetophenone (1 part) and ethyl N-toluene-p-sulphonyloxamate (10 parts) in 80 parts by volume of dioxan was added to a solution of 1.3 parts of sodium in 100 parts of ethanol, and the resulting mixture was heated under reflux for 20 hours. After cooling, a large excess of ether was added and this mixture was extracted with water. The aqueous extract was acidified and the mixture was extracted with chloroform and at this stage bis(N,N′-toluene-p-sulphonyl) oxamide was removed by filtration. The dried chloroform solution was then evaporated to yield a sticky solid which was washed with ether and the ether extracts decanted to leave a further amount of bis(N,N′ toluene-p-sulphonyl) oxamide. The ethereal solution on evaporation gave an oil which was dissolved in ethanol (20 parts) containing 0.4 part of concentrated hydrochloric acid. After heating for 15 minutes the solvent was removed under vacuum and a brown oil was obtained. This was hydrolysed by heating with aqueous sodium bicarbonate. Heating was continued until a complete solution was obtained and then, after treating with charcoal and filtering, 6-(2-ethoxyethoxy) chromone-2-carboxylic acid, melting point 215–217°, identical with the material prepared in Example 5 was obtained on acidification.

EXAMPLE 11

A mixture of 5-(2-ethoxyethoxy)-2-hydroxyacetophenone (20 parts) and ethyl ethoxydichloroacetate (50 parts) was heated at 150–170° C. for 6 hours. After evaporating the volatile products of the reaction under reduced pressure, a mixture was obtained which was hydrolysed by dissolving in a solution of glacial acetic acid containing 12% concentrated hydrochloric acid (500 parts) and refluxing for 24 hours. After cooling, a solid was filtered off and washed with water. This solid was purified by dissolving in aqueous sodium bicarbonate, treating the hot solution with charcoal, filtering and precipitating with concentrated hydrochloric acid to give 6 - (2 - ethoxyethoxy) chromone - 2 - carboxylic acid, melting point 215–217° identical with the material prepared in Example 5.

EXAMPLE 12

The compounds set out in Table I were tested to assess their effectiveness in inhibiting antibody-antigen reactions.

In the antibody-antigen tests, the effectiveness of the compounds of the invention in inhibiting the passive cultaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 150 gms. were infected subcutaneously at weekly intervals with $N.\ muris$ larvae in doses increasing from about 200 larvae per animal to 2000 larvae per animal in order to establish the infection in rats. After 8 weeks the rats were bled by heart puncture and 15–20 mls. of blood collected from each animal. The blood samples were then centrifuged at 3500 r.p.m. for 30 minutes in order to remove the blood cells from the blood plasma. The blood was collected and used to provide a serum containing $N.\ muris$ antibody. A pilot sensitivity test was carried out to determine the least quantity of serum required to give a skin weal in control animals in the test described below of $>2$ cm. diameter. It was found that optimum sensitivity of rats in the body weight range 100–130 gms. was obtained using a serum diluted with eights parts of water, This diluted solution is called antibody serum A.

The antigen to react with the antibody in serum A was prepared by removing $N.\ muris$ worms from the gut of the infested rats, centrifuging the homogenate and collecting the supernatent liquor. This liquid was diluted with water to give a protein content of 1 g./ml. and is known as serum B.

Sprague-Dawley rats in the body weight range 100 to 130 gms. were sensitised by intra dermal injection of 0.1 mls. of serum A into the right flank. Sensitivity was allowed to develop for 24 hours and the rats were then injected intraveneously with 1 ml./100 gms. body weight of a mixture of serum B (0.25 ml.), Evans Blue dye solution (0.25 ml.) and the solution of the compound under test (0.5 ml. varying percentages of active matter). Insoluble compounds were administered as a separate intraperitoneal injection 5 minutes before intraveous administration of serum B and Evans Blue dye. For each percentage level of active matter in the solution under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was addessed by comparing the size of the characteristic blue weal produced by spread of the Evans Blus dye from the sensitisation site, with the side of the weal in the control animals. The size of the weal was rated as 0 (no weal detected, i.e., 100% inhibition) to 4 (no difference in size of weal, i.e. no inhibition) and the percentage inhibition for each dose level calculated as:

Percent inhibition $$= \frac{(\text{Control group score} - \text{treated group score}) \times 100}{\text{Control group score}}$$

The percentage inhibitions for the various dose levels were plotted graphically for each compound. From these graphs the dosage required to achieve a 50% inhibition of the anaphylactic reaction ($ID_{50}$) may be determined. These results are tabulated in Table I.

TABLE I

| Name of compound: | $ID_{50}$ values in mg./kg. of the salt |
|---|---|
| Sodium 7 - (2-ethoxyethoxy)chromone-2-carboxylate | $>5$ |
| Sodium 7-(2-hydroxypropoxy)-8-methyl-chromone-2-carboxylate | 2.5 to 4.8 |
| Sodium 7-(2-hydroxypropoxy)chromone-2-carboxylate | $>5$ |
| Sodium 7 - (2-ethoxyethoxy)-8-methyl-chromone-2-carboxylate | 2.5 to 8.9 |
| Sodium 6-(ethoxyethoxy)chromone-2-carboxylate | $>5$ |

TABLE I—Continued

| Name of compound: | ID$_{50}$ values in mg./kg. of the salt |
|---|---|
| Disodium 7-carboxymethoxychromone-2-carboxylate | >5 |
| Sodium 8-(2-hydroxypropoxy)chromone-2-carboxylate | >5 |
| Disodium 6-carboxymethoxychromone-2-carboxylate | >5 |

We claim:

1. A compound selected from the group consisting of chromone derivatives of the formula

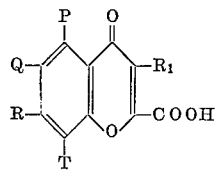

in which at least one of Q, R and T represents —OY wherein Y is selected from the group consisting of hydroxyl-alkyl, alkoxy-alkyl, carboxy-alkyl, dihydroxy-alkyl, alkoxy-alkoxy-alkyl, alkoxy-hydroxy-alkyl, phenoxyalkyl, furfuryl, tetrahydrofurfural, dioxolanyl, alkyl substituted dioxolanyl, glucosyl and ribosyl in which groups the alkyl and alkoxy portions are lower alkyl or lower alkoxy, P and those of Q, R and T which do not form an —OY group are selected from hydrogen, halogen, alkyl containing from 1 to 10 carbon atoms, alkyl containing from 1 to 10 carbon atoms and substituted by halogen, hydroxy or lower alkoxy; hydroxy, alkoxy containing from 1 to 10 carbon atoms, carboxy, nitro, lower alkylamino, di-lower alkyl amino or anilino, or an adjacent pair of P and those of Q, R, and T which do not represent an —OY group, together with the adjacent carbon atoms on the benzene ring, form a pyridine or benzene ring, $R_1$ is selected from the hydrogen, alkyl, carbocyclic aryl and alkoxy containing from 1 to 10 carbon atoms, pharmaceutically acceptable salts thereof, pharmaceutically acceptable amides with ammonia or mono- or di-lower alkyl amines or aniline or amino acids, and pharmaceutically acceptable esters with alkanols containing up to 10 carbon atoms or dialkylaminoalkanols.

2. A compound according to claim 1 selected from the group consisting of chromone derivatives of the formula

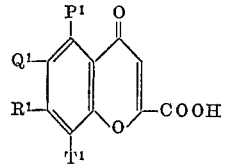

wherein at least one of $Q^1$, $R^1$ and $T^1$ is —$OY^1$ wherein $Y^1$ is selected from hydroxyalkyl, alkoxyalkyl, carboxyalkyl, alkoxyalkoxyalkyl, alkoxyhydroxy alkyl and phenoxyalkyl, P and those of $Q^1$, $R^1$ and $T^1$ which are not —$OY^1$ are selected from hydrogen, chlorine, bromine, alkyl, hydroxy, alkoxy, carboxy, nitro, amino, alkylamino, alkyl carrying a hydroxy, alkoxy, chlorine or bromine substituent, in which groups the alkyl and alkoxy portions contain from 1 to 8 carbon atoms, and pharmaceutically acceptable salts, esters and amides thereof as defined in claim 1.

3. A compound according to claim 2, wherein $R^1$ is hydrogen, one of Q, R and T is selected from lower hydroxalkoxy, lower carboxy alkoxy and lower alkoxy-lower alkoxy, and P and the remainder of Q, R and T are selected from hydrogen and lower alkyl, and pharmaceutically acceptable salts, esters and amides thereof as defined in claim 2.

4. A compound according to claim 1, which is 7-(2-ethoxyethoxy) chromone-2-carboxylic acid.

5. A compound according to claim 1 which is 7-(2-hydroxypropoxy)-8-methylchromone-2-carboxylic acid.

6. A compound according to claim 1 which is 7-(2-hydroxypropoxy)chromone-2-carboxylic acid.

7. A compound according to claim 1 which is 7-(2-ethoxyethoxy)-8-methylchromone-2-carboxylic acid.

8. A compound according to claim 1 which is 6-(2-ethoxyethoxy)chromone-2-carboxylic acid.

9. A compound according to claim 1 which is 7-carboxymethoxychromone-2-carboxylic acid.

10. A compound according to claim 1 which is 8-(2-hydroxypropoxy)chromone-2-carboxylic acid.

11. A compound according to claim 1 which is 6-carboxymethoxychromone-2-carboxylic acid.

12. A compound according to claim 1 in the form of the sodium salt thereof.

13. A compound as claimed in claim 1 in the form of a pharmaceutically acceptable salt wherein the cation is selected from the group consisting of ammonium, alkali metals, alkaline earth metals, alkyl amines, and alkanolamines.

14. A compound as claimed in claim 13 in the form of a pharmaceutically acceptable salt wherein the cation is selected from the group consisting of ammonium, alkali metals, alkaline earth metals, alkyl amines, and alkanolamines.

References Cited

UNITED STATES PATENTS

| 3,427,324 | 2/1969 | Fitzmaurice | 260—345.2 X |
| 3,484,445 | 12/1969 | Lee et al. | 260—345.5 X |

JOHN M. FORD, Primary Examiner

U.S. Cl. X.R.

260—345.5, 210 F, 287 R, 340.6, 295 F, 347.3, 326.3, 152, 340.9, 244, 250 R, 521 R, 999; 424—283